United States Patent
Esswie

(10) Patent No.: US 12,501,309 B2
(45) Date of Patent: Dec. 16, 2025

(54) PACKET DATA SET AWARE RETRANSMISSION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 363 days.

(21) Appl. No.: 18/339,990

(22) Filed: Jun. 22, 2023

(65) Prior Publication Data

US 2024/0430736 A1 Dec. 26, 2024

(51) Int. Cl.
*G06F 15/173* (2006.01)
*H04W 28/02* (2009.01)

(52) U.S. Cl.
CPC .............................. *H04W 28/0268* (2013.01)

(58) Field of Classification Search
None
See application file for complete search history.

(56) References Cited

U.S. PATENT DOCUMENTS

2021/0075631 A1* 3/2021 Liao ................. H04M 15/8038

FOREIGN PATENT DOCUMENTS

| WO | 2021/136636 | 7/2021 |
| WO | 2022/233439 | 11/2022 |

OTHER PUBLICATIONS

International Search Report and Written Opinion for PCT Application No. PCT/US2023/036201 mailed Feb. 29, 2024, 15 pages.

\* cited by examiner

*Primary Examiner* — Wing F Chan
*Assistant Examiner* — Andrew Woo
(74) *Attorney, Agent, or Firm* — Amin, Turocy & Watson, LLP

(57) ABSTRACT

A radio access network node may group traffic packets of a traffic flow directed to a user equipment according to quality-of-service metric targets associated with the packets. The node may append a group quality-of-service indication indicative of a group quality-of-service to a group of packets associated with a less stringent group quality-of-service metric target than is associated with the traffic flow. The group quality-of-service indication may be contained in a medium access control control element and may comprise an index or a quality-of-service metric target that is configured via a packet group configuration. Packets associated with different quality of service metric targets may be transmitted in the same transport block. The user equipment may avoid requesting retransmission of an unsuccessfully decoded packet based on the group quality of service indication, even if the unsuccessfully decoded packet would otherwise result in a violation of a quality-of-service associated with the traffic flow.

20 Claims, 13 Drawing Sheets

PACKET DATA SET AWARE RETRANSMISSION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, receiving at least one protocol data unit (e.g., at least one packet) directed to a user equipment, wherein the at least one protocol data unit corresponds to a traffic flow associated with a flow quality of service, and facilitating, by the radio access network node, grouping the at least one protocol data unit into a protocol data unit group associated with a group quality of service. The method may further comprise facilitating, by the radio access network node, appending, to the protocol data unit group, a group quality of service indication indicative of the group quality of service, and facilitating, by the radio access network node, transmitting, to the user equipment, the protocol data unit group via a transport block corresponding to the flow quality of service (e.g., the transport block may be associated with a quality of service that is the same as a quality of service associated with the traffic flow). The group quality of service indication may be indicative to the user equipment to receive the at least one protocol data unit according to the group quality of service instead of according to the quality of service corresponding to the traffic flow or corresponding to the transport block.

In an embodiment, the group quality of service indication may comprise a first error rate corresponding to the protocol data unit group that is different than a second error rate corresponding to the transport block.

In an embodiment, the method may further comprise facilitating, by the radio access network node, transmitting, to the user equipment, a protocol data unit group configuration comprising at least one protocol data unit group identifier corresponding to at least the group quality of service. The group quality of service indication may comprise the at least one protocol data unit group identifier corresponding to at least the group quality of service. The flow quality of service, which may be a default quality of service corresponding to the traffic flow, may correspond to a flow error rate according to which the user equipment is to request retransmission of a protocol data unit corresponding to the transport block. The group quality of service may correspond to a group error rate according to which the user equipment is to request retransmission of a protocol data unit corresponding to the protocol data unit group. The group error rate may be specified to be used by the user equipment as a basis to override the flow error rate with respect to a protocol data unit, corresponding to the protocol data unit group, received, by the user equipment, via the transport block.

In an embodiment, the group quality of service indication may be appended to the protocol data unit group in a medium access control control element. In an embodiment, the medium access control control element may comprise a protocol data unit group identifier corresponding to the group quality of service.

In another example embodiment, a radio access network node may comprise a processor configured to receive first packets associated with a first quality of service; receive second packets associated with a second quality of service, wherein the first packets and the second packets are directed to a user equipment, group the first packets into a first packet group and the second packets into a second packet group; and transmit, to the user equipment, the first packets of the first packet group and the second packets of the second packet group in a transport block associated with the first quality of service. The first quality of service and the second quality of service may be different.

In an embodiment, the processor may be further configured to append, to the second packet group, a group quality of service indication indicative of the second quality of service. The first quality of service may correspond to a first packet error rate. The second quality of service may correspond to a second packet error rate. The group quality of service indication may comprise the second packet error rate. The group quality of service indication may be indicative to the user equipment to receive the second packets according to the second quality of service.

In an embodiment, the processor may be further configured to transmit, to the user equipment, a packet group configuration comprising a group identifier associated with the second quality of service, wherein the group quality of service indication comprises the group identifier corresponding to the second quality of service.

In an embodiment, the first quality of service may be associated with a traffic flow corresponding to the user equipment, and the first packets and the second packets may be associated with the traffic flow corresponding to the user equipment.

In yet another example embodiment, a non-transitory machine-readable medium may comprise executable instructions that, when executed by a processor of a network node that is part of a radio access network, facilitate performance of operations, comprising operating a communication session, with a user equipment, comprising at least one traffic flow associated with a first quality of service. The operations may further comprise transmitting, to the user equipment, a packet group configuration comprising at least one quality identifier associated with at least one second quality of service, receiving at least one first packet, directed to the user equipment, associated with the at least one traffic flow and associated with the first quality of service, and receiving at least one second packet, directed to the user equipment, associated with the at least one traffic flow and associated with the at least one second quality of service.

The operations may further comprise associating, with the at least one second packet, a quality identifier indicative of one of the at least one second quality of service being associated with the at least one second packet, and transmitting, to the user equipment, the at least one first packet, the at least one second packet, and the quality identifier associated with the at least one second packet, via a transport block corresponding to the first quality of service.

In an embodiment, the quality identifier indicative of one of the at least one second quality of service being associated with the at least one second packet may be indicative to the user equipment to receive the at least one second packet according to the at least one second quality of service.

In an embodiment, the quality identifier indicative of one of the at least one second quality of service being associated with the at least one second packet may correspond, in the packet group configuration, to a first error rate that is that is different than a second error rate corresponding to the transport block.

In an embodiment, the at least one traffic flow may correspond to an application being facilitated by the user equipment. The application may be an anything reality application. The at least one first packet and the at least one second packet may correspond to a pose portion of a virtual reality appliance.

DETAILED DESCRIPTION OF THE DRAWINGS

Figure 1:
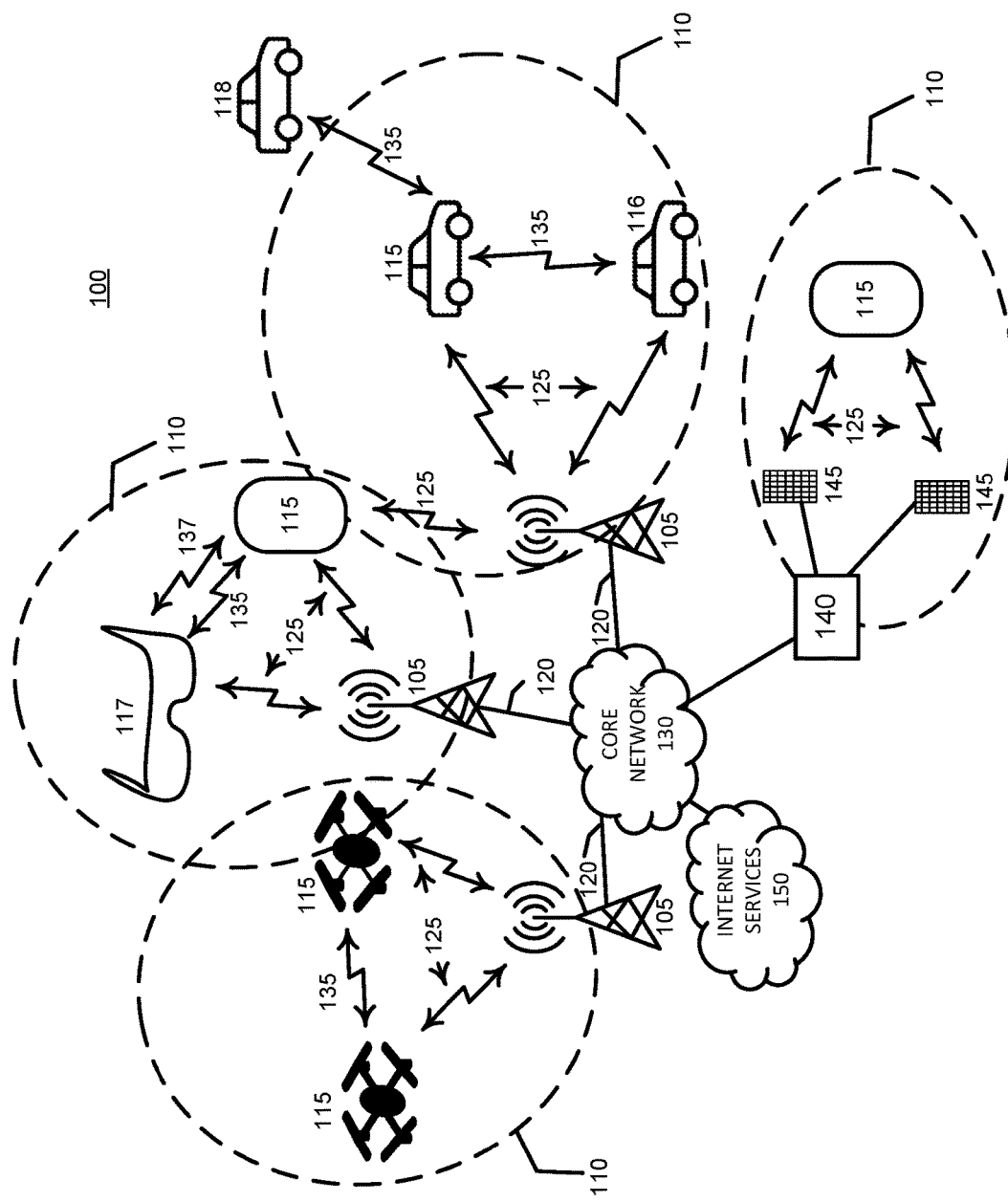
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate, but may also be sporadic, or bursty, in nature. In addition, different packet traffic flows of a single XR communication session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic while minimizing power consumption.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHZ) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
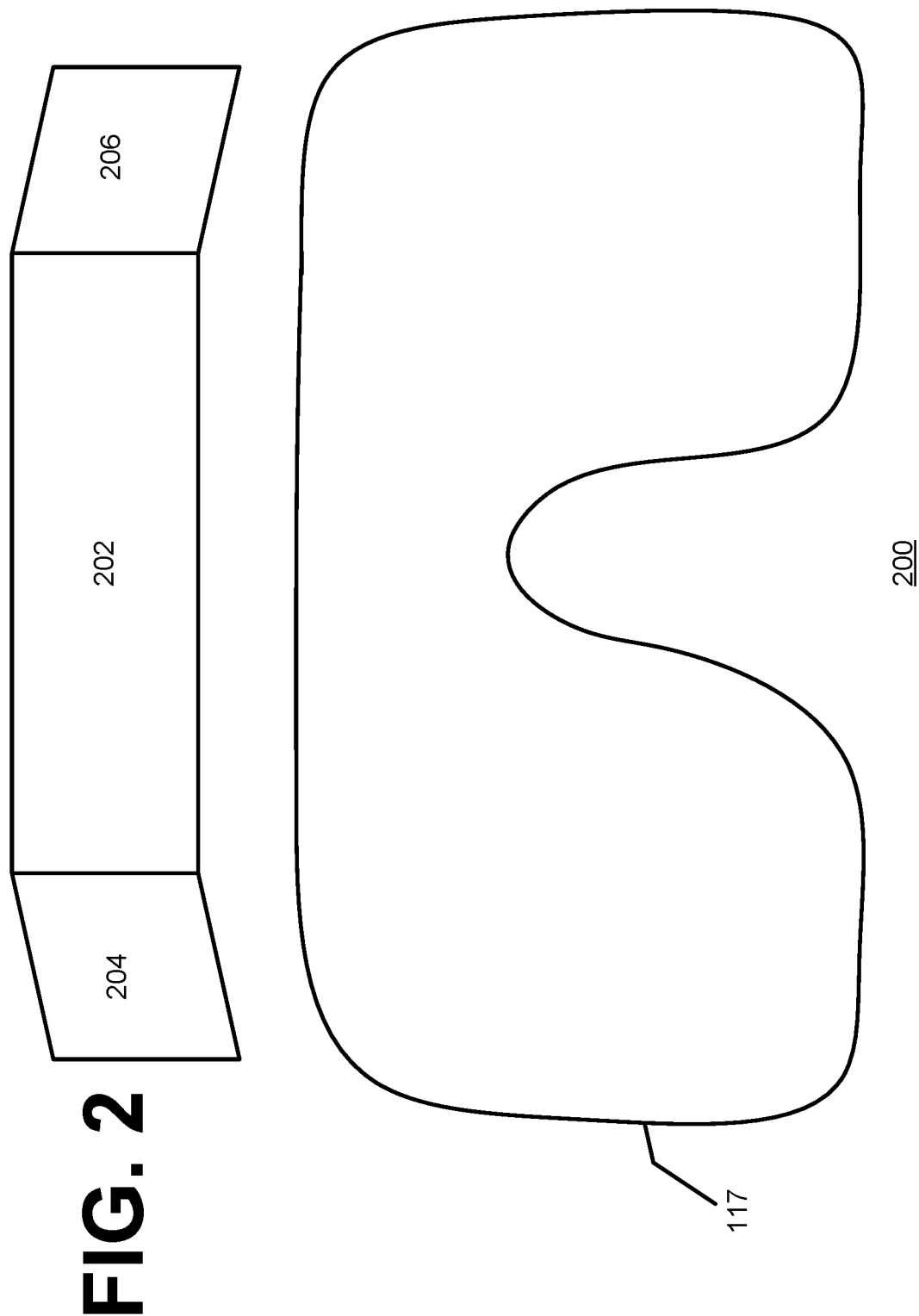
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center, visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user device may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different Qos classes.

XR services typically require high bandwidth, low latency, and high reliable connections to deliver seamless and immersive experiences to users. Data exchanged between XR devices and servers, including real-time video, audio, and tracking information, are often sensitive to phenomena, such as delays, packet loss, and jitter. These phenomena can result in motion sickness, decreased presence, and reduced overall user satisfaction. Therefore, managing quality-of-service for traffic flows facilitating XR services is desirable to mitigate effects of the phenomena and to provide a seamless and immersive experience to users. Quality-of-service for XR services may be optimized via management of handling of protocol data units (PDUs) (e.g., packets) that are the basic units of data transmitted over a network. PDUs carry information needed to reconstruct XR content at the receiving end. Managing PDUs may involve various techniques such as prioritization, scheduling, error correction, and congestion control, which can significantly affect the quality-of-service of XR services. Awareness of QoS corresponding to PDUs may facilitate XR service providers, network operators, and XR content developers in managing PDUs to minimize phenomena such as, for example, latency, packet loss, and jitter.

Traffic characteristics of interest corresponding to XR traffic may comprise high bandwidth. XR services typically require significant amounts of data to be transmitted in real-time to create immersive experiences. VR typically involves streaming large amounts of high-resolution (e.g., high-definition) video and audio data, which can result in high bandwidth requirements. Low latency is also a traffic characteristic of interest relative to XR service traffic flows. XR services typically require low latency to ensure real-time interaction and feedback. Delays in data transmission can result in motion sickness, decreased presence, and reduced user satisfaction. Thus, low-latency network performance is desirable to deliver smooth and responsive XR experiences.

Bursty traffic is another characteristic that may be of interest relative to XR traffic. XR traffic can be highly variable in nature, with bursts of data being transmitted in short intervals. For example, with VR, sudden movements or changes in the field of view can result in rapid changes in the amount of data being transmitted.

Another characteristic of interest relative to XR services is real-time tracking of head movements, gestures, and interactions, which require precise and timely data delivery. Delays in real-time tracking data transmission can result in synchronization issues and degrade an overall XR experience. Similarly, XR traffic may be sensitive to packet loss and jitter. XR content, such as video and audio, is highly sensitive to packet loss and jitter-minor disruptions in data transmission can result in artifacts, glitches, and degraded quality of an XR experience.

XR traffic is typically asymmetric, with more data typically being transmitted from a content server to the XR device than in the reverse direction. This is because XR devices primarily receive data, such as video and audio, from a content server, while sending minimal data, such as user inputs and tracking information, back to the server. XR traffic patterns can be dynamic and unpredictable, depending on the user's movements, interactions, and changes in the XR environment. This dynamic nature of XR traffic may be facilitated by adaptive QoS management techniques that are designed to optimize performance. Network operators, XR service providers, and content developers may take into account XR traffic characteristics for communication network design, for implementing QoS policies, and for optimizing XR content delivery to ensure a high-quality, seamless, and immersive XR experience for users.

XR services traffic may be considered as being associated with critical, or stringent, quality-of-service requirements due to the need for high broadband capacity, very low radio latency, and high reliability. Moreover, XR traffic characteristics are highly dynamic, and can vary from one set of packets to another (e.g., from on packet data unit group to another), even for packets corresponding to the same XR traffic flow and/or service. Such variation may be due to the advanced XR source rendering techniques that result in different XR packets (even from the same XR traffic flow) having different levels of importance with respect to an end user's experience. Thus, it is desirable to attempt to match radio QoS treatment of packets to different QoS targets associated with different PDU sets, or packet groups, corresponding to a given XR traffic flow instead of attempting to match treatment of all packets of an XR traffic flow with QoS targets/requirements that are applicable to the entire XR traffic flows. However, using conventional techniques, QoS adaptation is applied globally, or uniformly, to a traffic flow such that all packets, or PDU sets, corresponding to a single flow are treated equally to satisfy a QoS target, or targets, assigned to the XR traffic flow. Such equal treatment may result in inefficient use of radio resources. For example, during an active XR video rendering session, video PDU sets (or packets groups) corresponding to a traffic flow facilitating the XR session may contain information representative of different viewing aspects. For example, for augmented reality services, a PDU set group comprise information corresponding to an Ultra HD XR virtual objects, and other packets, or packet set group, may comprise information that relates to real environment objects. Both PDU set groups may comprise video frames that are received by a RAN in the same radio transport block. Thus, the RAN node may assign the transport block and corresponding packets with a uniform/global/default set of QoS target applicable to all packets corresponding to the XR traffic flow. Although the different PDU set groups may generally be associated with the same (e.g., common) QoS requirements (e.g., similar target radio latency range), the packets may have differing levels of importance with respect to impact on the end user experience due to different viewing purposes of the different packets. Thus, having a uniform QoS profile for all packets of a traffic flow is suboptimal. For example, loss/drops/unsuccessful decoding of certain packets may be tolerated, with respect to an end user's experience, better than packets loss of other packets since an XR user may not observe or notice streaming lags or drops of packets corresponding to certain viewed objects but may observe or notice lags or drops of packets corresponding to other viewed objects. Thus, applying different treatment (e.g., a different target, or permissible, packet error rate) to different packets of a traffic flow is desirable.

Accordingly, embodiments disclosed herein facilitate PDU-set-dependent QoS adaptation, whereby different PDU set groups may be treated unequally despite corresponding to the same traffic flow. Thus, target QoS requirements associated with a traffic flow may define a common, average, QoS profile comprising QoS treatment to be applied for all carried PDU set groups, but the PDU-set-dependent QoS targets may be dynamically indicated to a user equipment such that the user equipment may overwrite, or override, common flow-specific QoS targets with respect to packets corresponding to the PDU-set-dependent quality of service targets. For example, a packet-group-specific packet error rate target may be appended to one or more PDU set groups. A user equipment may overwrite, or override, packet treatment corresponding to the flow-common QoS target information and may instead treat packets corresponding to the packet-group-specific packet error rate target according to the packet-group-specific packet error rate target. Thus, different PDU sets carried via the same traffic flow can be adaptively treated according to partially different, or fully different, QoS targets. Thus, flexibility with respect advanced XR rending techniques for immersive XR user experience can be achieved to result in more efficient use of radio resources that may otherwise be less efficient if more restrictive (e.g., more stringent) common flow-specific QoS packet treatment is applied.

Emerging XR services, including services having advanced video rendering capabilities, typically require a highly refined QoS adaptation over the radio interface. That is, QoS adaptation, tracking and fulfillment on the level of PDU set or PDU set groups. However, conventional techniques only support flow-specific QoS adaptation, where a given traffic flow is associated with a pre-defined QoS profile (e.g., a QoS target, such as packet error rate or radio latency, that should be satisfied for all packets corresponding to the flow). Thus, according to conventional techniques, all PDU sets corresponding to the same traffic flow are treated equally to satisfy the flow QoS target(s).

Using conventional techniques may be suitable for services where different packets or PDU sets share a single common or average QoS target set the packets/PDUs are carried via the same transport block and correspond to a single traffic flow. However, for XR services with advanced rendering capabilities, different PDU sets, despite being carried over the same traffic flow, may require various full or partial QoS target handling because with advanced rendering of real and virtual objects in an active XR session, the quality of object viewing/streaming may be perceived differently by the end user if the same QoS target is applied to packets corresponding to the real and virtual information.

For example, some highly detailed augmented objects may not tolerate any packet losses or drops, for immersive user experience, while surrounding objects, which may appear as stationary, may tolerate reduced quality that may result from packet drops. Conventional techniques do not facilitate PDU set differentiation. Accordingly, using conventional techniques, different PDU sets, or set groups, carried via a given traffic flow are treated equally to satisfy one or more flow QoS metric targets corresponding to the given traffic flow since the packets are transported via the same traffic flow (e.g., the traffic clos comprises downlink packets directed to pose video streaming). Conventional techniques only facilitate QoS adaptation at the flow level. Thus, single/semi-static QoS enforcement behavior of both the network and/or devices during the transmission and/or reception of each traffic flow (e.g., device/network treatment of all packets belonging to same flow is same, and semi-statistically defined) is implemented.

According to embodiments disclosed herein, dynamic QoS adaptation at the packet or PDU set level may be facilitated by configuring multiple dynamic QoS enforcement behaviors at a user equipment or at a RAN node for different packets or PDU sets that may be associated with the same traffic flow. According to embodiments disclosed herein, medium access control control elements, carrying PDU set QoS indications and/or explicit PDU set QoS information, may be appended to a group of packets, associated with a traffic flow, that correspond to one or more different QoS metric targets, than QoS metric targets that are associated with the traffic flow.

Packet Data Set Aware Re-Transmissions and QoS Differentiation

Embodiments disclosed herein may dynamically enforce PDU-set-specific QoS handling of packets regardless of a target QoS profile associated with a traffic flow carrying the packets. A protocol data unit group configuration may comprise at least one protocol data unit group identifier corresponding to at least the group quality of service and may comprise a list of PDU sets, or set group identifiers, or indications, where an identifier or indication is associated with a certain target QoS metric set. (e.g., a maximum allowable packet error rate that when violated or exceeded may trigger PDU set retransmission requests). The protocol data unit group configuration may be delivered to active user equipment devices using device-specific (e.g., specific to a particular UE) or device common (e.g., directed to more than one active UE) downlink control signaling. Accordingly, for downlink traffic transmission during an active communication session, a RAN node may assigns a transport block of payload, which transport block may comprise multiple different PDU sets, or set groups, associated with different QoS targets, to a downlink traffic flow, wherein the downlink traffic flow is associated with one or more QoS targets, or target profiles, that different from at least one of the QoS targets associated with at least one of the PDU sets, or set groups. During flow traffic transmission, the RAN node may dynamically append a medium access control ("MAC") control element ("CE") to one or more of the PDU sets, belonging to the active traffic flow, indicating the PDU set identifier and/or an explicit target PDU-set-specific QoS metric to be applied with respect to the PDU set to which the MAC-CE is appended. At a user equipment receiving the traffic flow, the UE normally receives and decodes the different PDU sets, or set groups, belonging to active traffic flow, according to the flow-specific QoS metric targets. For a PDU set to which a MAC CE containing either a PDU set ID or indication (from the configured list of the first configuration step) and/or explicit PDU set specific QoS metrics is not appended, the user equipment may decode packets of a PDU set according to the general QoS profile targets corresponding to the traffic flow carrying the packets. However, if the user equipment device determines that a certain PDU set identifier/index/indication has been appended to the payload of the PDU set, the user equipment may decode packets of the PDU set according to the associated PDU-set-specific QoS target metrics, instead of according to QoS metrics associated with the carrying flow.

For example, a flow may be associated with a general allowable packet error rate of 10% and a PDU set, or set group, may be dynamically associated with a 5% packet error rate. Thus, when a user equipment device determines, for instance, a 6% packet error rate while decoding packets corresponding to the 5% error rate, the user equipment may trigger reliability recovery procedures, (e.g., transmitting a full or partial PDU set retransmission request towards serving RAN node) notwithstanding that the actual packet error rate is still below the allowable packet error rate of the carrying flow because the user equipment overrides the general 10% error rate associated with the traffic flow and applies QoS targets associated with for the PDU sets associated with the 5% error rate to the packets. Accordingly, embodiments disclosed herein may facilitate a refined and on-demand QoS adaptation with respect to highly dynamic traffic types, down to a packet or PDU set level, thus facilitating efficient support for emerging traffic types that correspond to advanced rendering capabilities.

Figure 3:
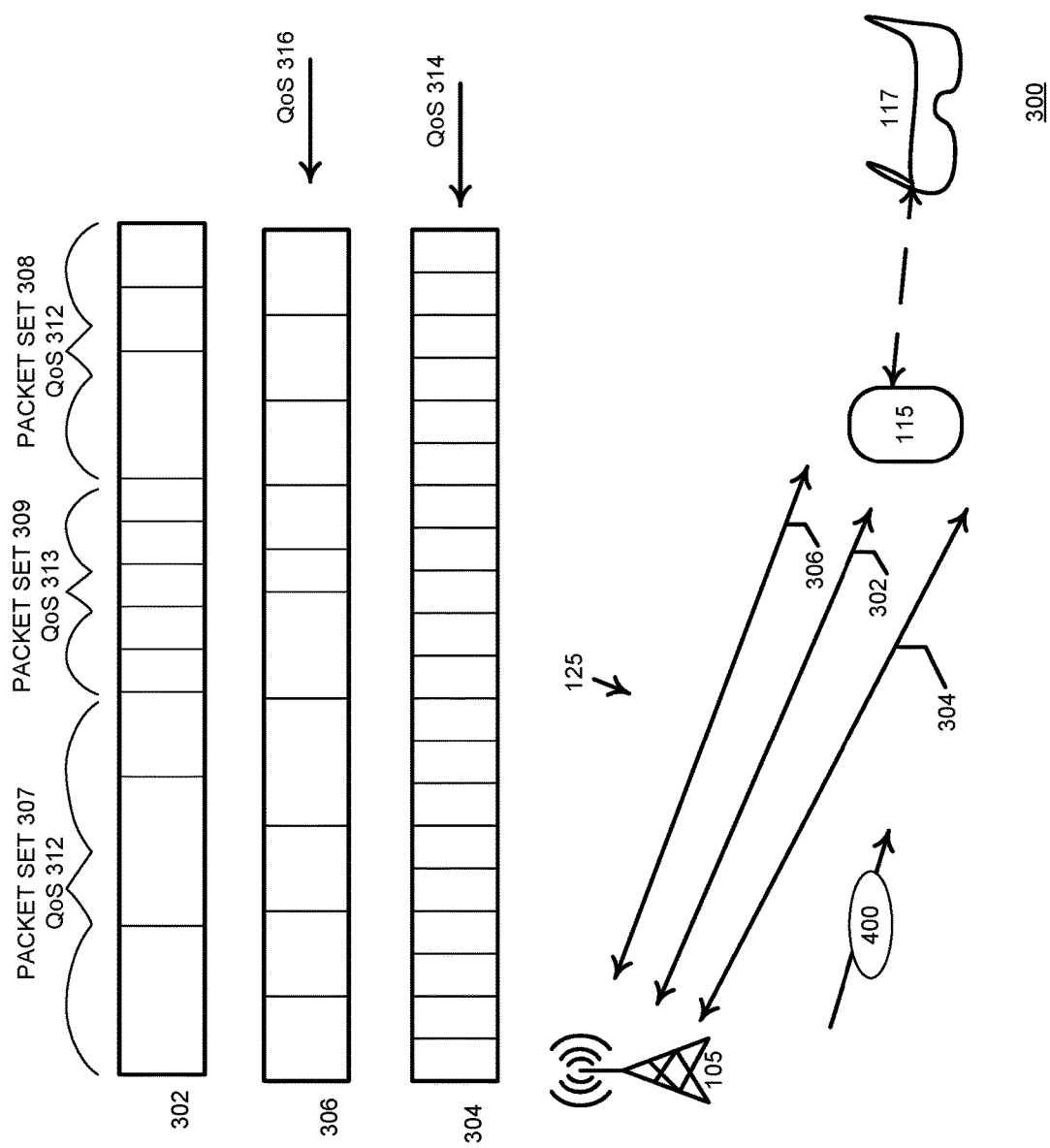
FIG. 3 illustrates an example packet group configuration.

Turning now to FIG. 3, the figure illustrates an environment 300. Virtual reality appliance 117 may configured via configuration 400 to communicate, via wireless link 125, packets corresponding to one or more traffic flows 302, 304, and 306. Traffic flows 304 and 306 may be associated with quality of service 314 and quality of service 316, respectively. Traffic flow 302 may comprise packets associated with different qualities of service. Packets of traffic flow 302 may be grouped together. As shown in the figure, packets corresponding to quality-of-service 312 may be grouped into packet set 307 and packet set 308. Packets corresponding to quality-of-service 313 may be grouped into packet set 309.

In an embodiment, traffic flow 302 may comprise traffic directed to a pose portion of appliance 117. However, some traffic directed to the post portion of appliance 117 may correspond to a different quality of service, for example quality of service 313, then a configured quality of service corresponding to traffic flow 302 generally. For example, packets of packets at 307 and packet set 308 may be associated with traffic carrying image information corresponding to high bandwidth low latency traffic that may be used to render high-definition video directed to be presented via a pose portion of appliance 117 to a wearer of the appliance. However, packets associated with quality-of-service 313 may be grouped into packet set 309 and may correspond to packets that may carry traffic having a lower quality of service than quality of service 313 that may be used to be used to render an image, via a pose portion of appliance 117, and that may be dropped or discarded without affecting the experience of a wearer of appliance 117. Thus, packets corresponding to the lower quality of service 313 are grouped into packet set 309 and may not need to be delivered with the same quality of service as packets of packet sets 307 and 308. Packets corresponding to traffic flows 304 and 306 may carry information used to render images on peripheral portions of appliance 117. Thus, although traffic flows 302, 304, and 306 may carry traffic directed to appliance 117, each of the traffic flows may be associated with a different quality of service. Furthermore, different packets of the same traffic flow, for example traffic flow 302, may be associated with different qualities of service.

Figure 4:
FIG. 4 illustrates an example implicit indication of a packet group quality of service.

Turning now to FIG. 4, the figure illustrates an example a protocol data unit group configuration 400 comprising at least one protocol data unit group, or set, identifier 405A-405$n$ corresponding to at least one respective group quality of service value 410A-410$n$. In an embodiment, a quality-of-service value 410, which may be a target quality of service value, such as a target error rate, may be associated with a traffic flow. In an embodiment, a quality-of-service value 410 may be associated with a transport block corresponding to a traffic flow. A protocol data unit identifier 405 may be referred to as an index. An identifier/indication/index 405 may correspond to a protocol data unit set, or packet set, associated with a quality-of-service metrics 410. In the example shown in FIG. 5, a selected quality-of-service metric may be a target maximum packet error rate ("PER") to be supported for PDU sets or set groups corresponding to the respective PDU SET identifier 405. In an embodiment, configuration 400 may comprise available PDU set indications and may be signaled, or transmitted, to active user equipment devices via a device-specific control channel signal resource corresponding a user equipment device. In an embodiment, configuration 400 may be broadcast as a device-common signaling message to multiple user equipment devices that either support, or that may need to adopt, facilitation of PDU set quality-of-service.

Figure 5:
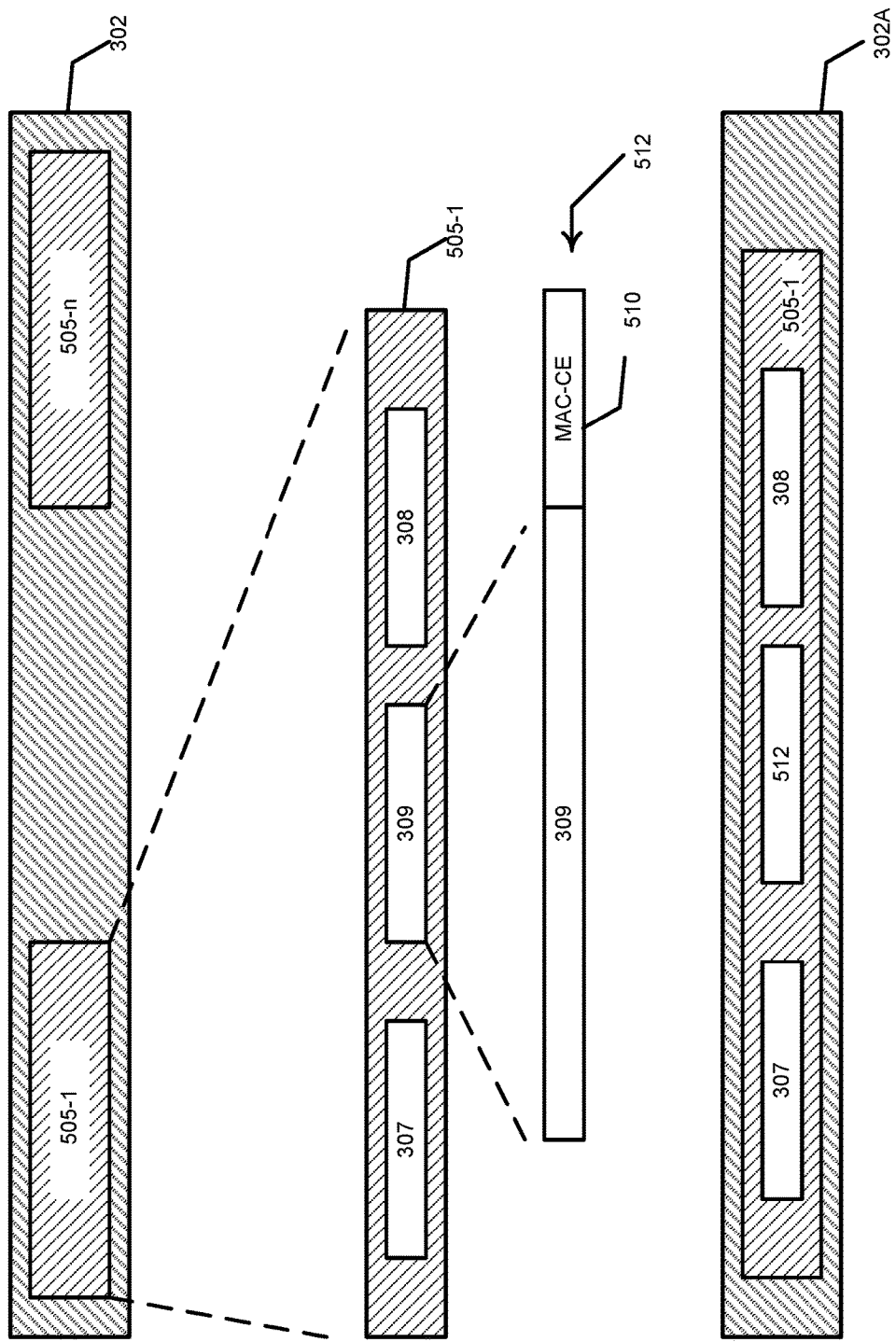
FIG. 5 illustrates an example indication of a packet group quality of service.

As described in reference to FIG. 3, traffic flow 302, as shown in FIG. 5, may comprise multiple transport blocks 505-1 . . . 505-$n$ to carry payload packets. For XR rendering services, packets, for example packets directed to an XR appliance such as appliance 117 shown in FIGS. 1, 2, and 3, may be grouped into PDU sets or PDU set groups. For example, when packets associated with a first quality of service and other packets associated with the second quality of service are available at a RAN node for transmission to a user equipment, the RAN node may group the packets associated with the first quality of service into a first group or first set of packets and the RAN node may group the packets associated with the second quality of service into a second group, or second set, of packets. Thus, a packet set, or a packet set group, may comprise packets that are associated with quality-of-service characteristics common to the group or set and that serve a purpose common to the group or set. For example, the RAN node may use a transport block to carry packets corresponding to a traffic flow comprising image or video frame information directed to pose portion 202 of appliance 117 shown in FIG. 3. However, some of the packet sets may comprise packets that represent augmented/virtual objects viewed within the pose portion 202 of appliance 117. Packets carrying image or frame information may have a low latency or high reliability quality of service requirement due to a high definition video characteristic to be rendered by the image of frame information, whereas packets that carry information related to objects to be viewed within the post portion and that may be static or that may not have a high variability may be associated with the lower reliability or a lower latency since dropping or discarding of one or more of the packets corresponding to the object information may not negatively impact the experience of a user using appliance 117. The traffic flow carrying the packets directed to the pose portion of appliance 117 may be configured with a quality of service that corresponds to a high reliability or a low latency. However, since packets carrying static object information may also be carried in the same traffic flow as the high reliability or low latency packets but do not require as high a reliability or as low a latency as the packets carrying the high definition image or video information, treating the packets carrying the static information in the same manner as packets carrying the high reliability or low latency image or video information may result in resources being wasted if a packet carrying static information is discarded and if a user equipment corresponding to an appliance receiving the packets requests retransmission of the discarded packet.

Efficient co-transmission of packets being associated with different qualities of service in the same traffic flow may be facilitated by a RAN node appending a Medium Access Control control element ("MAC CE") to one or more PDU sets or packet sets, or set groups. An appended medium access control control element may comprise PDU/packet-set-specific QoS information corresponding to the PDU set(s) or set group(s).

In an embodiment, PDU set QoS information may be indicated implicitly by an appended PDU set identifier or indication, such as an identifier 405 shown in FIG. 4, that is associated with a certain PDU set specific QoS metric set 410, as depicted by the configuration 400 shown in FIG. 4.

In another embodiment illustrated in FIG. 5, the PDU set QoS information may be represented explicitly in terms of the target QoS metric values including the PDU set target PER. For example, as shown in FIG. 5, radio access network node 105 may assign packets of packet sets 307, 308, and 309 to be transmitted to user equipment 115 in transport block 505-1 as shown in FIG. 3. Continuing with description of FIG. 5, medium access control control element 510 may be appended to packets of packet group 309 to indicate to a user equipment that may receive and decode packets of group 309 that a quality of service, such as quality of service 313 shown in FIG. 3, that corresponds to packets of packet set 309 is different than a quality of service that may be a default quality of service associated with traffic flow 302, which default quality of service may correspond to a more stringent quality of service, for example, a lower latency requirement or a higher reliability requirement, than a quality of service that corresponds to packets of packet group 309. Instead of transport block 505-1 of traffic flow 302 carrying packets of packet group 307, 308, and 309, traffic flow 302 may be modified such that transport block 505-1 carries packets of packet group 307, packet group 308, and composite packet group 512, which may comprise packets of packet group 309 and medium access control control element 510 as shown in traffic flow 302A. Thus, if a packet of group 309 is not successfully received at a user equipment, based on information in control element 510 being indicative that the quality of service corresponding to packets of group 309 is less stringent than quality of service corresponding to traffic flow 302 generally, the user equipment may avoid requesting retransmission of the packet that was not successfully received.

Information contained in the control element 510 may be referred to as a group quality of service indication and may be indicative of the group quality of service associated with packets of group 309. In an embodiment, information contained in control element 510 may comprise an identifier 405 (shown in FIG. 4) corresponding to a packet set. In another embodiment, information contained in control element 510 may comprise an actual quality of service parameter metric 410 (shown in FIG. 4), for example a determined packet error rate associated with packets of group 309. Information contained in control element 510 may correspond to higher error rate than a default error rate corresponding generally to traffic flow 302 as shown in FIG. 5. Thus, a user equipment receiving packets in transport block 505-1 may request retransmission of an unsuccessfully received packet of groups 307 and 308 due to a stringent error rate being associated with packets of groups 307 and 308, and the user equipment may avoid requesting retransmission of one or more unsuccessfully received packets of packet group 309 until a number of unsuccessfully received packets of group 309 corresponds to an error rate that exceeds an error rate indicated and control element 510.

Figure 6:
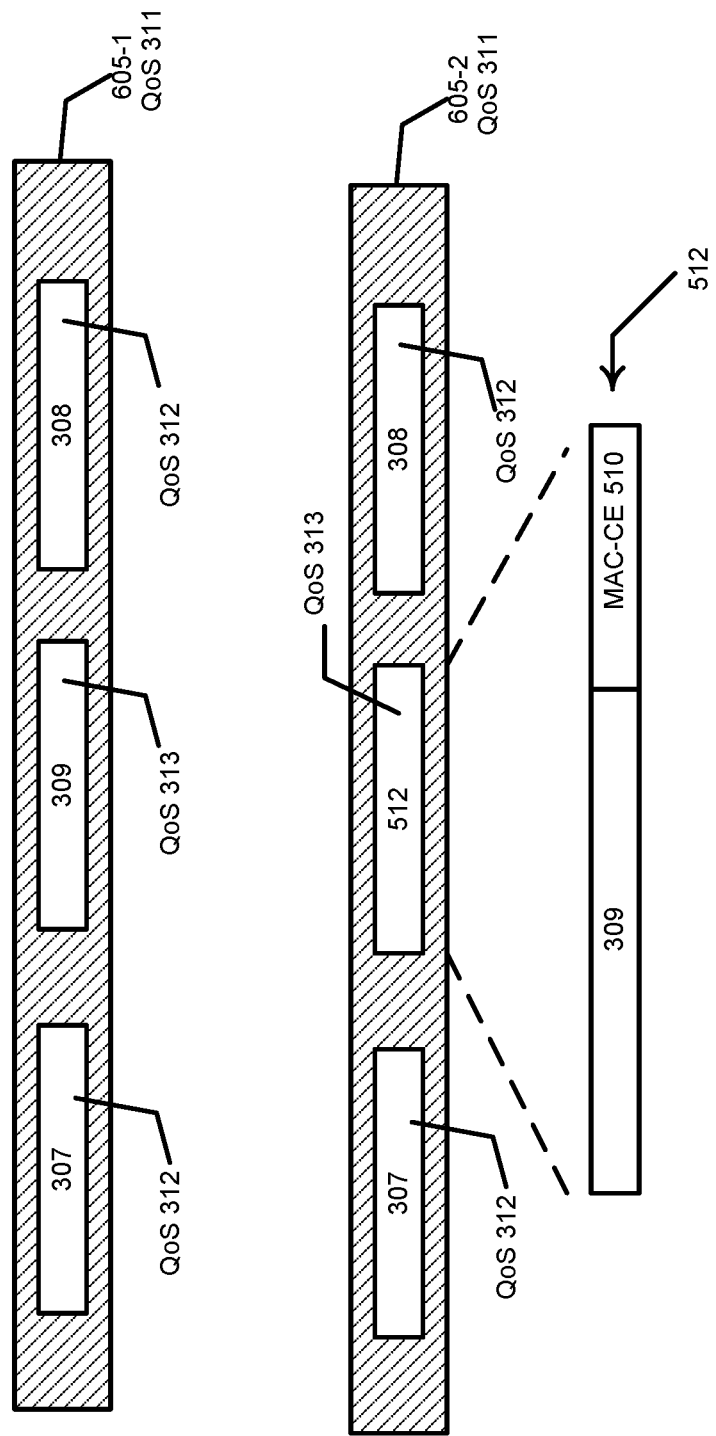
FIG. 6 illustrates an example traffic flow.

As shown in FIG. 6, an active user equipment device, receiving a traffic flow comprising transport block 605-1 that comprises multiple PDU/packet sets 307, 308, and 309, may determine whether there is MAC CE appended to any of the PDU sets. In case there is not a MAC CE (e.g., CE 510 is not appended to packet group 309) carrying PDU set QoS information appended to a PDU set of the transport block, a user equipment device may consider QoS metric targets corresponding to all the PDU sets to be the same metric targets defined for a traffic flow corresponding to transport block 601-1.

However, as shown with respect to transport block 605-2, in case a CE is appended to one or more PDU set(s) and comprises PDU-set-specific QoS information (e.g., CE 510 is appended to packet group 309 to result in composite packet group 512), a user equipment device receiving packets in transport block 605-2 may override QoS profile information 311 corresponding to transport block 605-2, or corresponding to a traffic flow of which transport block 605-2 is a part, and instead treat packets of composite packet group 512 according to QoS profile information corresponding to QoS profile information 313 that may be indicated, implicitly, or explicitly, by CE 510. For the remaining PDU sets, without PDU set specific QoS information appended, the user equipment device may resume applying the original flow-specific QoS profile targets. It will be appreciated that, as shown in FIG. 6, packet groups 307 and 308 are shown as being associated with quality of service 312 and transport blocks 605-1 and 605-2 are shown as being associated with quality-of-service profile information 311. Thus although packets of packet group 307 and 308 correspond to a different quality of service profile 312 than quality of service profile information 311 corresponding to the transport blocks, because a control element has not been appended to packets of packet group 307 or 308 indicative of quality of service 312, a user equipment receiving packets via transport block 605-2 may treat packets of packet groups 307 or 308 according to quality of service profile information 311 instead of according to quality of service profile information 312.

Figure 7:
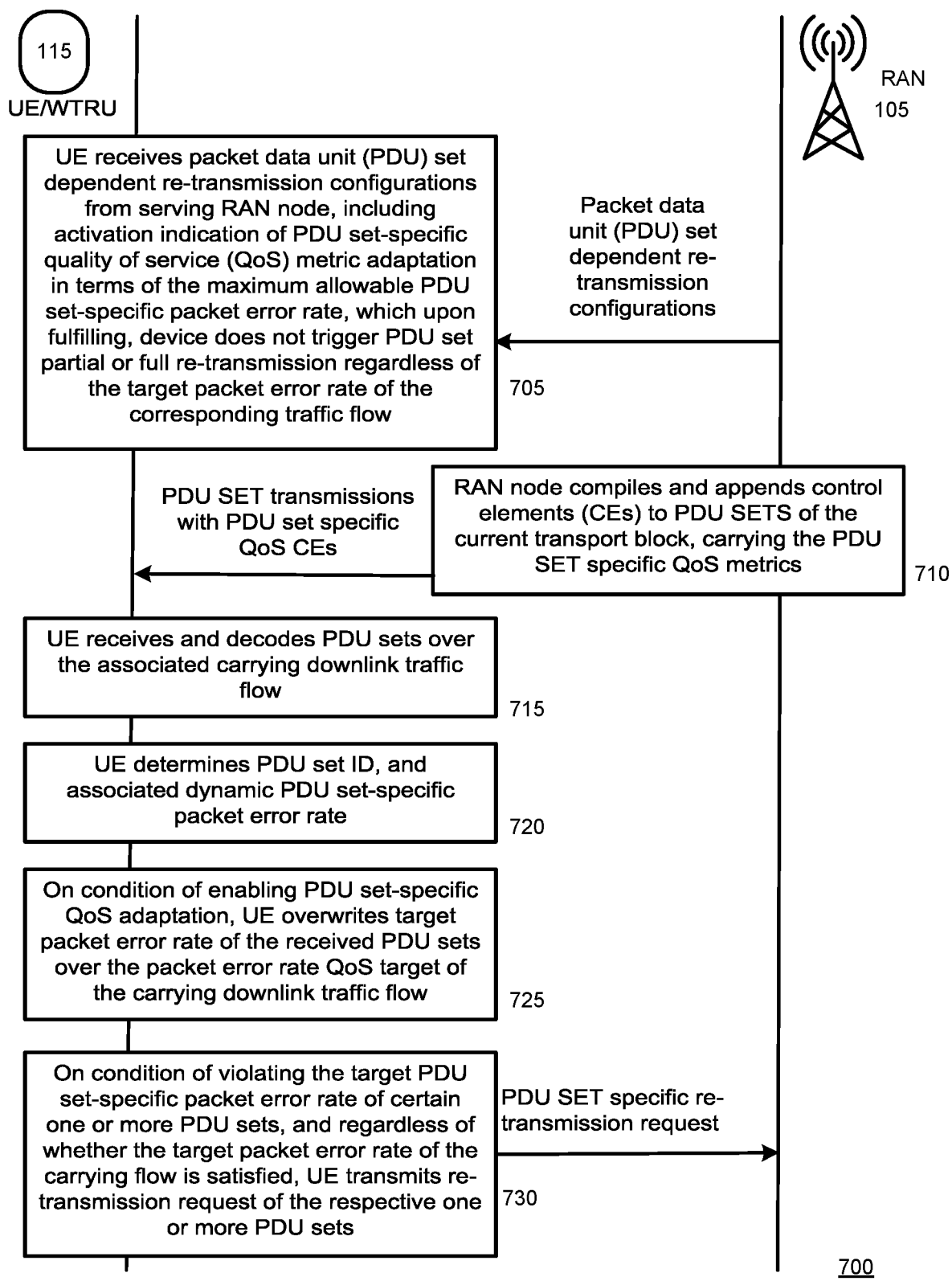
FIG. 7 illustrates a timing diagram of an example embodiment of indicating multiple quality of service targets associated with corresponding multiple packet groups of a traffic flow.

Turning now to FIG. 7, the figure illustrates a timing diagram of an example embodiment method 700 to indicate multiple quality of service targets associated with corresponding multiple packet groups of a traffic flow and to retransmit packets based on correspondence of the packets to a packet group. At act 705, RAN 105 may transmit to UE 115, and the UE may receive from the RAN, a protocol data unit group configuration, such as configuration 400 described in reference to FIG. 4, comprising at least one protocol data unit group identifier corresponding to at least one group quality of service. The protocol data unit group configuration may comprise protocol data unit (PDU) (e.g., packet) set dependent re-transmission configurations, that may comprise an activation indication, which may be referred to as a group quality of service indication and which may be indicative of a group quality of service a packet group. A group quality of service corresponding to a packet group may comprise a packet-set-specific quality of service metric, which may be indicated in terms of a maximum allowable PDU set-specific packet error rate. A maximum allowable packet set specific packet error rate may facilitate user equipment 115 avoiding triggering of PDU-set partial or full re-transmission procedures if a target packet error rate corresponding to a traffic flow carrying a packet group corresponding to the group quality of service indication is violated as long as the packet-set-specific quality of service metric is not violated. At act 710, RAN 105 may receive traffic packets directed to user equipment 115. RAN 105 may group packets directed to user equipment 115 according to quality-of-service metrics corresponding to the packets. RAN 105 may append medium access control control elements to the groupings of packets to indicate respective qualities of service corresponding to the packets of the packet groups.

At act 715, UE 115 may receive and decode PDU sets/packet sets corresponding to a traffic flow transmitted by RAN 105. At act 720, UE 115 may determine a PDU group/set identifier corresponding to packet groups of the traffic received at act 715, and from the configuration received at act 705, determine a PDU set-specific packet error rate corresponding to the traffic packets of the group, or groups, of packets received at act 715.

On condition of determining that packets of a group of packets received at act 715 have appended thereto a group quality of service indication in a MAC-CE indicating enabling of PDU set-specific QoS adaptation, UE 115 may, at act 725, overwrite, or override, treatment of the packets according to a target packet error rate associated with a traffic flow to which the receive packets correspond, and treat the packets according to information indicated in the MAC-CE. On condition of a violation of a target PDU set-specific packet error rate (e.g., an error rate indicated in a MAC-CE appended to a group, or set of packets) of one or more PDU sets, and regardless of whether the target packet error rate corresponding to the traffic flow carrying the flow is satisfied or violated, at act 730 UE 115 may transmit a re-transmission request corresponding to the one or more PDU sets that correspond to the target PDU set-specific packet error rate being violated.

Figure 8:
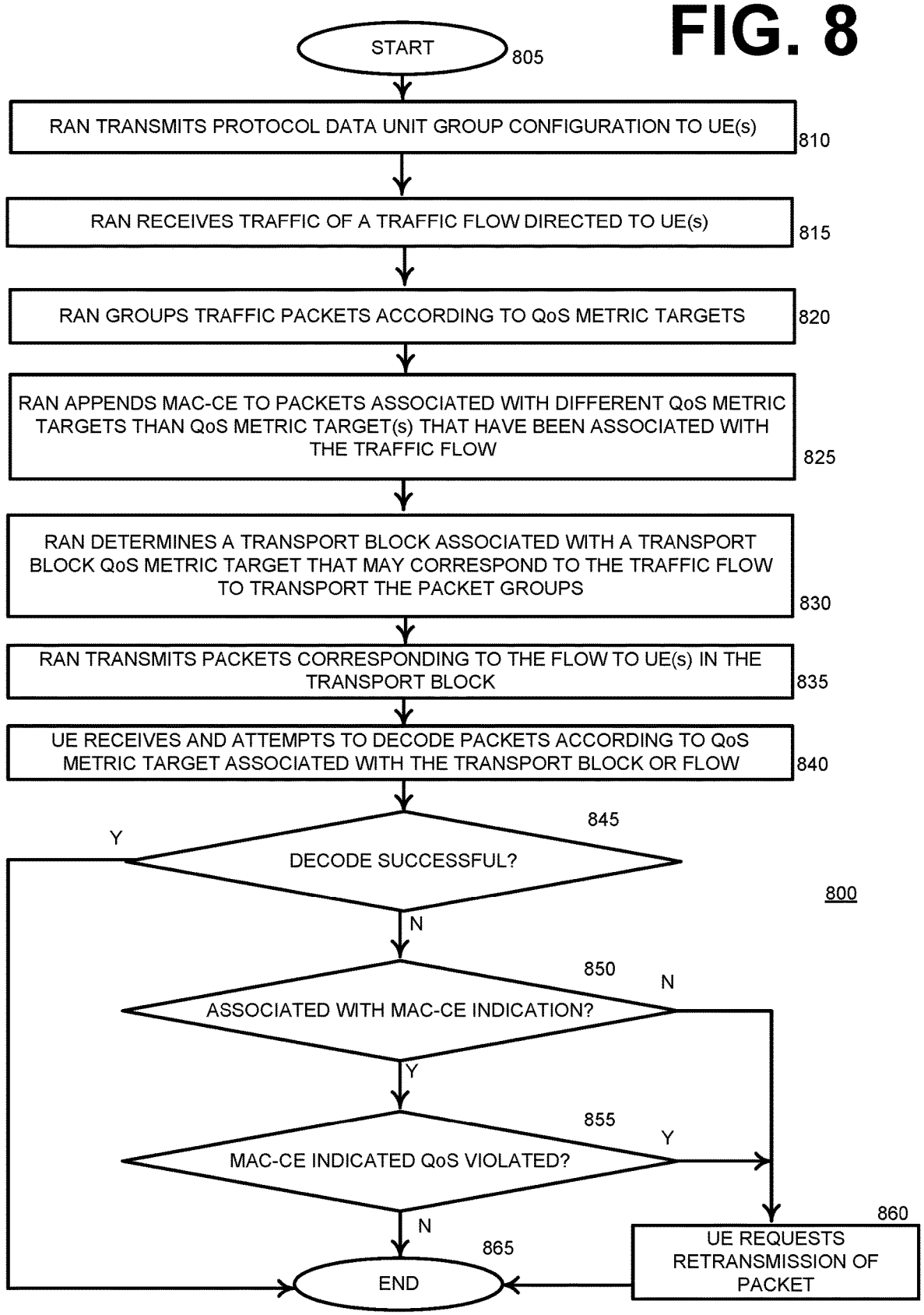
FIG. 8 illustrates a flow diagram of an example embodiment method indicating multiple quality of service targets associated with corresponding multiple packet groups of a traffic flow.

Turning now to FIG. 8, the figure illustrates a flow diagram of an example embodiment method 800 to indicate multiple quality of service targets associated with corresponding multiple packet groups of a traffic flow and to avoid retransmission of packets based on correspondence of the packets to a packet group having a different quality of service target than is associated with the traffic flow. Method 800 begins at act 805. At act 810, a radio access network node transmits a protocol data unit group configuration to one or more user equipment. An example protocol data unit group configuration is shown in FIG. 4. At act 815, the radio access network node may receive traffic, corresponding to a traffic flow, that is directed to one or more of the user equipment to which the protocol data unit group configuration was transmitted at act 810. At act 820, the radio access network node may group, or arrange into sets, the packets received at act 815. The radio access network node may group or arrange the packets according to correspondence of the packets to a particular quality of service metric target. For example, multiple packets that may be part of a traffic flow facilitating a virtual reality application may be directed to a pose portion of a virtual reality appliance, with some of the packets being associated with one or more quality of service target metrics that is/are more stringent than one or more quality of service target metrics associated with other packets associated with the flow. Thus, the radio access network node may arrange packets corresponding to a stringent quality of service target metric, for example a latency requirement, into a first set of packets, and packets corresponding to a less stringent quality of service target metric into a second set of packets. The traffic flow may be associated with the more stringent quality of service target metric since the traffic flow may comprise packets that may be directed to a pose portion of a virtual reality appliance.

At act 825, the radio access network node may append a medium access control control element to the grouping of packets associated with the less stringent quality of service metric target. The MAC-CE may comprise a group quality of service indication indicative of the less stringent group quality of service associated with the second set of packets. Thus, a user equipment receiving the second set of packets may treat the second set of packets according to the less stringent quality of service target metric based on information indicated in the group quality of service indication, such as information contained in MAC-CE 510 shown in FIG. 5.

At act 830, the radio access network node may select, create, generate, or otherwise determine a transport block to transmit the first set of packets and the second set of packets corresponding to the traffic flow to one or more user equipment. It will be appreciated that, in an embodiment, a single traffic flow may be directed to a single user equipment, for example a user equipment facilitating a virtual reality application, but in another embodiment a single traffic flow may be directed to multiple user equipment, for example if the traffic flow is associated with a multicast or broadcast communication session. At act 835, radio access network node may transmit the first set of packets and the second set of packets to the one or more user equipment using the transport block determined at act 830.

At act 840, a user equipment may receive one or more of the packets transmitted by the radio access network node at act 835 and may attempt to decode the received packets according to a quality of service metric target associated with the traffic flow to which the packets correspond or the transport block determined at act 830. At act 845, the user equipment may determine whether a packet received at act 840 has been decoded successfully. If a determination made at act 845 is that the packet was decoded successfully, method 800 advances to at 865 and ends, at least with respect to the packet determined to have been decoded successfully. (It will be appreciated that the user equipment may have received more than one packet at act 840 and thus may attempt to decode more than one packet, in which case act 845 may be performed iteratively until decoding of packets received at act 840 has been attempted and determined whether to have been successful.)

Returning to description of act 845, if a user equipment determines at act 845 that a packet received at act 840 was not decoded successfully, method 800 advances to act 850. At act 850, the user equipment may determine whether a packet for which decoding was unsuccessful is associated with a packet group, or packet set, to which a group quality of service indication indicative of a less stringent group quality of service is appended. If the user equipment determines that a packet that was determined to have not been successfully decoded at act 845 is not associated with a group quality of service indication that indicates a quality of service metric target that differs from quality-of-service metric target associated with a transport block used to transmit the packet from the radio access network node to the user equipment, the user equipment may transmit at act 860 a retransmission request, with respect to the unsuccessfully decoded packet, to the radio access network node requesting that the unsuccessfully decoded packet be retransmitted. Method 800 advances from act 860 to act 865 and ends.

Returning to description of act 850, if the user equipment determines at act 850 that a packet determined at act 845 to have been unsuccessfully decoded at act 840 is associated with a packet group, or a packet set, to which a group quality of service indication indicative of a less stringent group quality of service is appended, method 800 advances from act 850 to act 855. At act 855, the user equipment may determine whether a quality-of-service metric target indicated by the group quality of service indication has been violated by the unsuccessful decoding of the packet at act 840. For example, if the quality of service metric target indicated by the group quality of service indication corresponds to a higher packet error rate than a packet error rate associated with the traffic flow to which the packet corresponds, or is higher than a packet error rate associated with the transport block used at act 835 to transmit the packet, a permissible error rate indicated by the group quality of service indication may not be violated by the packet having been unsuccessfully decoded at act 840, whereas unsuccessful decoding of the packet may have otherwise resulted in a violation of a default, or general, error rate applicable to the traffic flow or to the transport block.

If a determination is made at act 855 that the unsuccessful decoding at act 840 of the packet results in violation of the higher permissible packet error rate indicated by the group quality of service indication appended to a packet group comprising the packet, the user equipment may request, at act 860, retransmission of the packet that was unsuccessfully decoded at act 840.

If a determination is made at act 855 that the unsuccessful decoding at act 840 of the packet does not result in a violation of the higher permissible packet error rate indicated by the group quality of service indication appended to the packet group, the user equipment may continue operation and support of an application to which the packet was directed without having successfully received the packet. In an example, if a group quality of service indication indicates, or corresponds to, a packet error rate of 100%, the user equipment would effectively treat packets of a packet group to which the group quality of service indication is appended as best effort traffic packets. Accordingly, packets associated with a less stringent quality of service target metric may be transmitted from a radio access network node to a user equipment using a transport block corresponding to a more stringent quality of service target metric, but use of resources to facilitate retransmission of an unsuccessfully decoded packet associated with the less stringent quality of service, which unsuccessful decoding may cause a violation of a general, or default, quality of service target metric associated with the transport block or the traffic flow, may be avoided if the unsuccessful decoding of the packet does not result in a violation of a less stringent quality of service metric target indicated in a MAC-CE appended to a packet group corresponding to the less stringent quality of service target metric.

Figure 9:
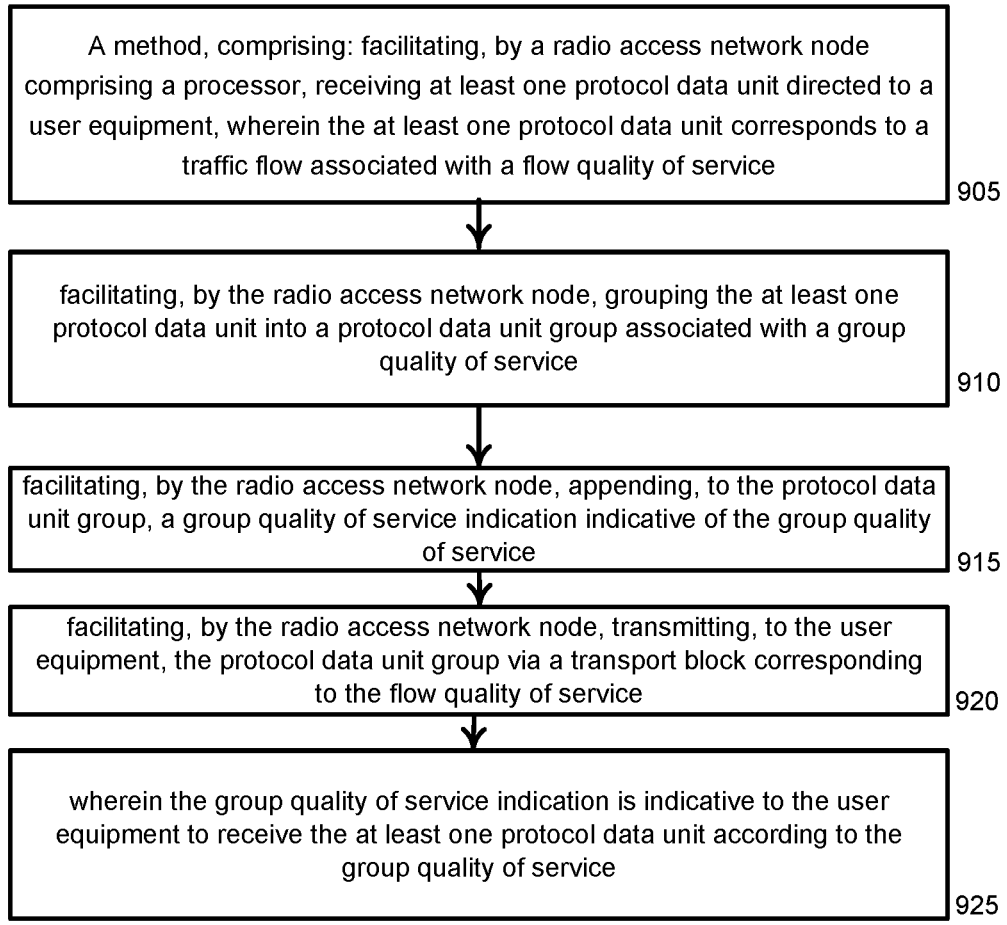
FIG. 9 illustrates a block diagram of an example method embodiment.

Turning now to FIG. 9, the figure illustrates an example embodiment method 900 comprising at block 905 facilitating, by a radio access network node comprising a processor, receiving at least one protocol data unit directed to a user equipment, wherein the at least one protocol data unit corresponds to a traffic flow associated with a flow quality of service; at block 910 facilitating, by the radio access network node, grouping the at least one protocol data unit into a protocol data unit group associated with a group quality of service; at block 915 facilitating, by the radio access network node, appending, to the protocol data unit group, a group quality of service indication indicative of the group quality of service; at block 920 facilitating, by the radio access network node, transmitting, to the user equipment, the protocol data unit group via a transport block corresponding to the flow quality of service; and sat block 925 wherein the group quality of service indication is indicative to the user equipment to receive the at least one protocol data unit according to the group quality of service.

Figure 10:
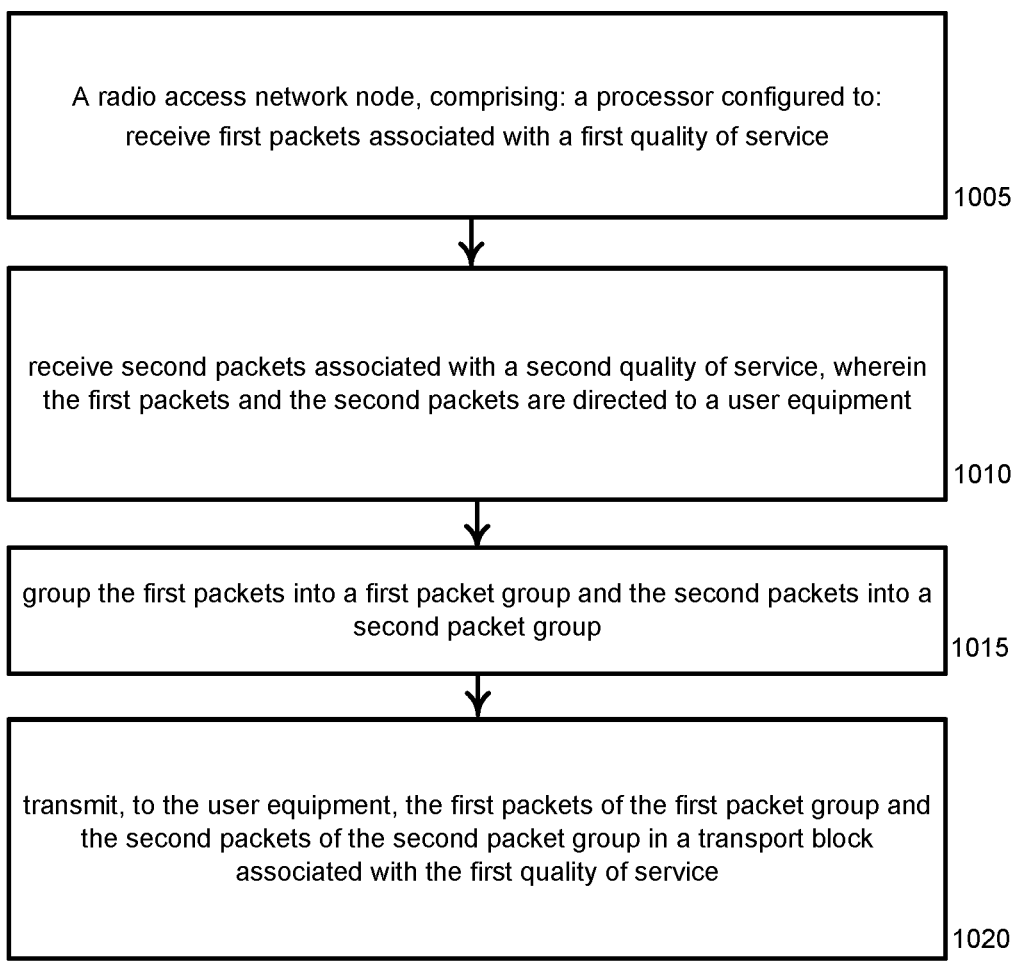
FIG. 10 illustrates a block diagram of an example radio access network node.

Turning now to FIG. 10, the figure illustrates an example radio access network node, comprising at block 1005 a processor configured to receive first packets associated with a first quality of service; at block 1010 receive second packets associated with a second quality of service, wherein the first packets and the second packets are directed to a user equipment; at block 1015 group the first packets into a first packet group and the second packets into a second packet group; and at block 1020 transmit, to the user equipment, the first packets of the first packet group and the second packets of the second packet group in a transport block associated with the first quality of service.

Figure 11:
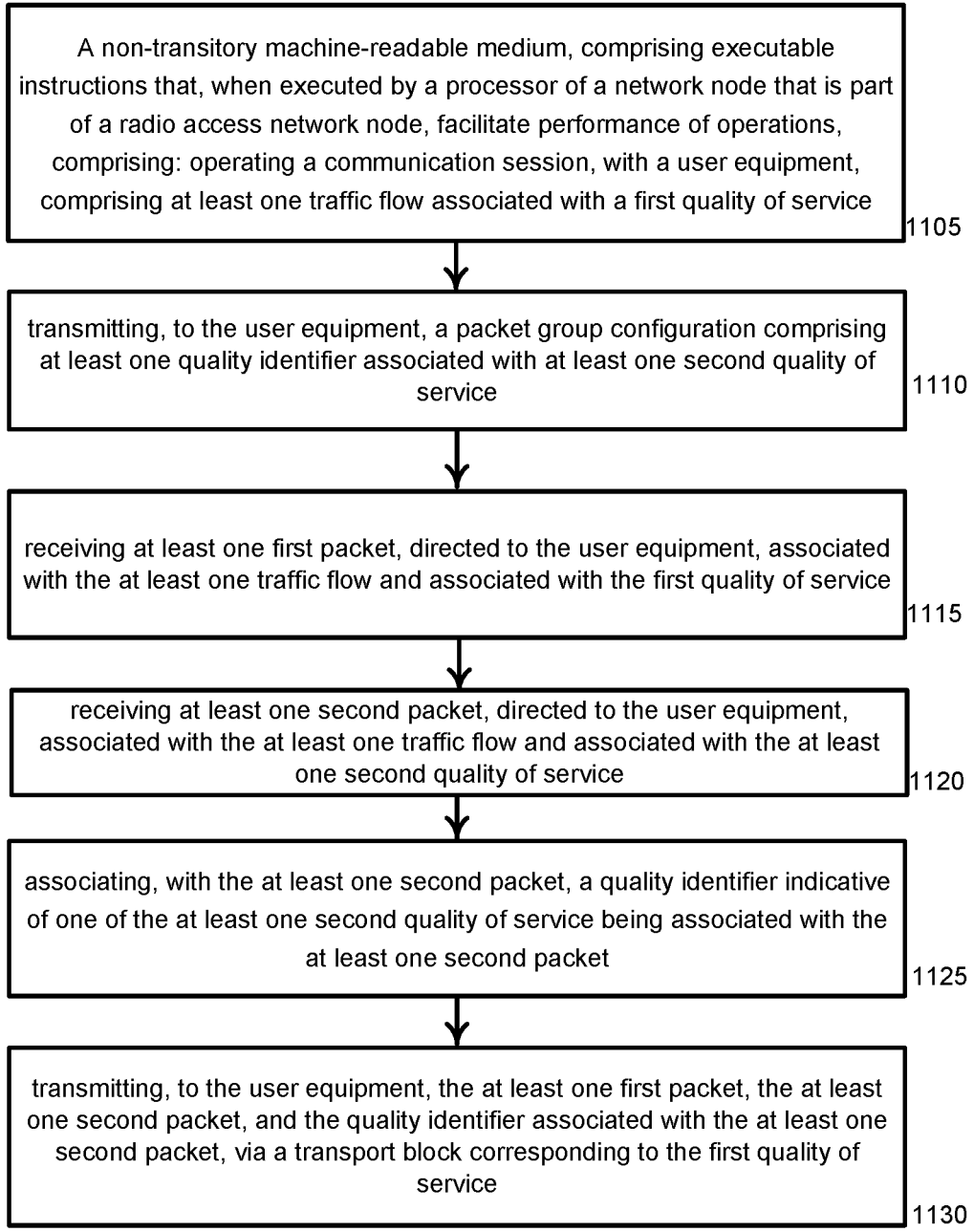
FIG. 11 illustrates a block diagram of an example non-transitory machine-readable medium embodiment.

Turning now to FIG. 11, the figure illustrates a non-transitory machine-readable medium 1100 comprising at block 1105 executable instructions that, when executed by a processor of a network node that is part of a radio access network, facilitate performance of operations, comprising operating a communication session, with a user equipment, comprising at least one traffic flow associated with a first quality of service; at block 1110 transmitting, to the user equipment, a packet group configuration comprising at least one quality identifier associated with at least one second quality of service; at block 1115 receiving at least one first packet, directed to the user equipment, associated with the at least one traffic flow and associated with the first quality of service; at block 1120 receiving at least one second packet, directed to the user equipment, associated with the at least one traffic flow and associated with the at least one second quality of service; at block 1125 associating, with the at least one second packet, a quality identifier indicative of one of the at least one second quality of service being associated with the at least one second packet; and at block 1130 transmitting, to the user equipment, the at least one first packet, the at least one second packet, and the quality identifier associated with the at least one second packet, via a transport block corresponding to the first quality of service.

Figure 12:
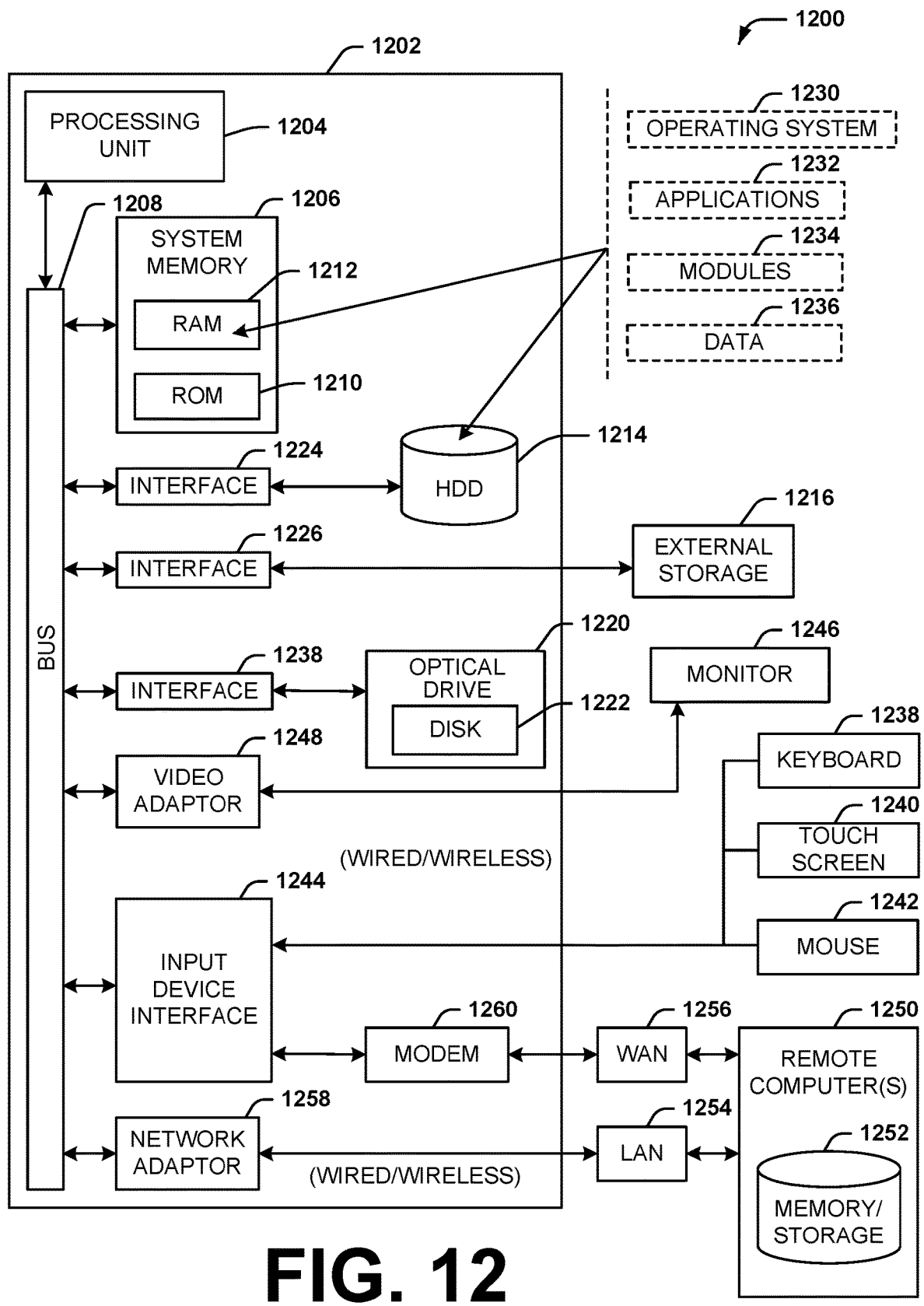
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1210. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
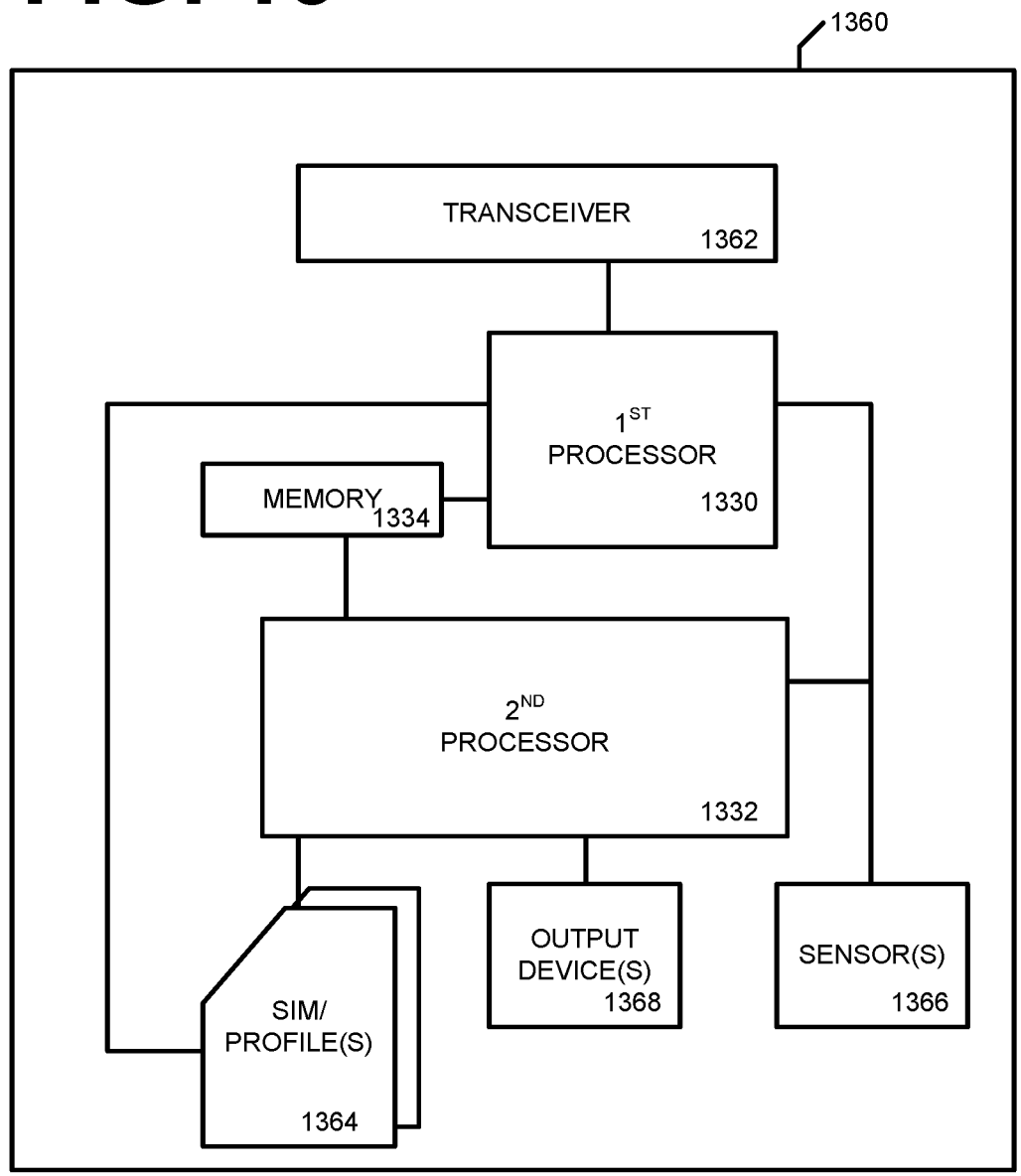
FIG. 13 illustrates a block diagram of an example wireless user equipment.

Turning now to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 34 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMSI") or information that may make up an IMSI.

SIM 1364 is shown coupled to both the first processor portion 1330 and the second processor portion 1332. Such an implementation may provide an advantage that first processor portion 30 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UE 1360.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| DTX | Discontinuous transmission |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |

TABLE 1-continued

| Term | Definition |
| --- | --- |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by a radio access network node comprising a processor, receiving at least one protocol data unit directed to a user equipment, wherein the at least one protocol data unit corresponds to a traffic flow associated with a flow quality of service;
   facilitating, by the radio access network node, grouping the at least one protocol data unit into a protocol data unit group associated with a group quality of service;
   facilitating, by the radio access network node, appending, to the protocol data unit group, a group quality of service indication indicative of the group quality of service; and
   facilitating, by the radio access network node, transmitting, to the user equipment, the protocol data unit group via a transport block corresponding to the flow quality of service,
   wherein the group quality of service indication is indicative to the user equipment to receive the at least one protocol data unit according to the group quality of service, and
   wherein the group quality of service indication comprises a first error rate corresponding to the protocol data unit group that is different than a second error rate corresponding to the transport block.

2. The method of claim 1, further comprising:
   facilitating, by the radio access network node, transmitting, to the user equipment, a protocol data unit group configuration comprising at least one protocol data unit group identifier corresponding to at least the group quality of service.

3. The method of claim 2, wherein the group quality of service indication comprises the at least one protocol data unit group identifier corresponding to at least the group quality of service.

4. The method of claim 2, wherein the flow quality of service corresponds to a flow error rate according to which the user equipment is to request retransmission of a protocol data unit corresponding to the transport block, wherein the group quality of service corresponds to a group error rate according to which the user equipment is to request retransmission of a protocol data unit corresponding to the protocol data unit group, and wherein the group error rate is to override the flow error rate with respect to a protocol data unit, corresponding to the protocol data unit group, received, by the user equipment, via the transport block.

5. The method of claim 1, wherein the group quality of service indication is appended to the protocol data unit group in a medium access control control element.

6. The method of claim 5, wherein the medium access control control element comprises a protocol data unit group identifier corresponding to the group quality of service.

7. The method of claim 1, wherein the first error rate is higher than the second error rate.

8. The method of claim 1, wherein the first error rate is lower than the second error rate.

9. A radio access network node, comprising:
   a processor configured to:
   receive first packets associated with a first quality of service;
   receive second packets associated with a second quality of service, wherein the first packets and the second packets are directed to a user equipment;
   group the first packets into a first packet group and the second packets into a second packet group;
   append, to the second packet group, a group quality of service indication indicative of the second quality of service; and
   transmit, to the user equipment, the first packets of the first packet group and the second packets of the second packet group in a transport block associated with the first quality of service,
   wherein the first quality of service corresponds to a first packet error rate, wherein the second quality of service corresponds to a second packet error rate, and wherein the group quality of service indication comprises the second packet error rate.

10. The radio access network node of claim 9, wherein the first quality of service and the second quality of service are different.

11. The radio access network node of claim 9, wherein the group quality of service indication is to be indicative to the user equipment to receive the second packets according to the second quality of service.

12. The radio access network node of claim 9, wherein the processor is further configured to:
- transmit, to the user equipment, a packet group configuration comprising a group identifier associated with the second quality of service,
- wherein the group quality of service indication comprises the group identifier corresponding to the second quality of service.

13. The radio access network node of claim 9, wherein the first quality of service is associated with a traffic flow corresponding to the user equipment, and wherein the first packets and the second packets are associated with the traffic flow corresponding to the user equipment.

14. A non-transitory machine-readable medium, comprising executable instructions that, when executed by a processor of a network node that is part of a radio access network, facilitate performance of operations, comprising:
- operating a communication session, with a user equipment, comprising at least one traffic flow associated with a first quality of service;
- transmitting, to the user equipment, a packet group configuration comprising at least one quality identifier associated with at least one second quality of service;
- receiving at least one first packet, directed to the user equipment, associated with the at least one traffic flow and associated with the first quality of service;
- receiving at least one second packet, directed to the user equipment, associated with the at least one traffic flow and associated with the at least one second quality of service;
- associating, with the at least one second packet, a quality identifier indicative of one of the at least one second quality of service being associated with the at least one second packet; and
- transmitting, to the user equipment, the at least one first packet, the at least one second packet, and the quality identifier associated with the at least one second packet, via a transport block corresponding to the first quality of service,
- wherein the quality identifier indicative of one of the at least one second quality of service being associated with the at least one second packet corresponds, in the packet group configuration, to a first error rate that is different than a second error rate corresponding to the transport block.

15. The non-transitory machine-readable medium of claim 14, wherein the quality identifier indicative of one of the at least one second quality of service being associated with the at least one second packet is indicative to the user equipment to receive the at least one second packet according to the at least one second quality of service.

16. The non-transitory machine-readable medium of claim 15, wherein the quality identifier comprises a medium access control control element.

17. The non-transitory machine-readable medium of claim 16, wherein the medium access control control element comprises a protocol data unit group identifier corresponding to a group quality of service associated with at least one first packet and the at least one second packet.

18. The non-transitory machine-readable medium of claim 14, wherein the at least one traffic flow corresponds to an application being facilitated by the user equipment.

19. The non-transitory machine-readable medium of claim 18, wherein the application is an anything reality application.

20. The non-transitory machine-readable medium of claim 19, wherein the at least one first packet and the at least one second packet correspond to a pose portion of a virtual reality appliance.

* * * * *